United States Patent
Takeda et al.

(10) Patent No.: US 6,928,152 B2
(45) Date of Patent: Aug. 9, 2005

(54) CALL RECEPTION INFEASIBLENESS INFORMING SYSTEM AND METHOD

(75) Inventors: Kikuo Takeda, 12-1, Kojima 2-chome, Taito-ku, Tokyo 111-0056 (JP); Hisae Takeda, Tokyo (JP); Yoshiko Takeda, Tokyo (JP); Noriko Takeda, Tokyo (JP); Hiroko Takeda, Tokyo (JP)

(73) Assignee: Kikuo Takeda, Tokyo (JP)

( * ) Notice: Subject to any disclaimer, the term of this patent is extended or adjusted under 35 U.S.C. 154(b) by 436 days.

(21) Appl. No.: 10/239,873

(22) PCT Filed: Jan. 22, 2002

(86) PCT No.: PCT/JP02/00399

§ 371 (c)(1),
(2), (4) Date: Oct. 3, 2002

(87) PCT Pub. No.: WO02/063859

PCT Pub. Date: Aug. 15, 2002

(65) Prior Publication Data

US 2003/0138087 A1 Jul. 24, 2003

(30) Foreign Application Priority Data

Feb. 6, 2001 (JP) .......................................... 2001-29217
Mar. 30, 2001 (JP) .......................................... 2001-98094

(51) Int. Cl.[7] ............................................. H04M 11/10
(52) U.S. Cl. ................................. 379/207.02; 379/67.1; 455/412.1
(58) Field of Search .......................... 379/207.02, 67.1, 379/84, 88.18, 88.22, 88.23, 88.25; 455/412.1, 412.2, 414.2, 421, 418, 419, 420

(56) References Cited

U.S. PATENT DOCUMENTS 6,081,725 A * 6/2000 Ishida ......................... 455/462
6,275,690 B1 * 8/2001 Higuchi et al. ............. 455/412
6,631,183 B1 * 10/2003 Rautila et al. ........... 379/88.22
6,671,508 B1 * 12/2003 Mitsuoka et al. ........ 455/412.1
6,782,252 B1 * 8/2004 Kang et al. ................... 379/80

FOREIGN PATENT DOCUMENTS

JP          10-136080          5/1998

* cited by examiner

Primary Examiner—William J. Deane, Jr.
(74) Attorney, Agent, or Firm—Westerman, Hattori, Daniels & Adrian, LLP

(57) ABSTRACT

The present invention is a system and method for providing information concerning incoming call disablement in which a call-making mobile telephone terminal (20), which serves as a call-making telephone terminal, may be provided with information concerning a reason for incoming call disablement and a time period of incoming call disablement when a call-receiving mobile telephone terminal (10), which serves as a call-receiving telephone terminal, is unable to receive incoming calls due to various circumstances.

First, input of the reason for incoming call disablement and time period of incoming call disablement is received by the call-receiving mobile telephone terminal (10), whereupon the reason for incoming call disablement and time period of incoming call disablement are stored in the call-receiving mobile telephone terminal (10) or a computer (6) which serve as storage means.

Next, processing is performed by the call-receiving mobile telephone terminal (10) or the computer (6), serving as notification means, to notify the call-making mobile telephone terminal (20) of the reason for incoming call disablement and time period of incoming call disablement when a call is made from the call-making mobile telephone terminal (20) to the call-receiving mobile telephone terminal (10) at a time which is within the range of the time period of incoming call disablement.

Then, the call-making mobile telephone terminal (20) is notified of the reason for incoming call disablement and time period of incoming call disablement by means of an automatic voice message and/or alphanumeric information.

10 Claims, 5 Drawing Sheets

CALL RECEPTION INFEASIBLENESS INFORMING SYSTEM AND METHOD

TECHNICAL FIELD

The present invention relates to a system and method for providing information concerning the disablement of incoming calls in which, when a call-receiving mobile telephone terminal or fixed telephone terminal (referred to hereafter as "call-receiving telephone terminal") is unable to receive incoming calls due to various circumstances, a call-making mobile telephone terminal or fixed telephone terminal (referred to hereafter as "call-making telephone terminal") may be provided with information concerning the reason calls cannot be received and the period of time during which calls may not be received.

BACKGROUND ART

In mobile telephone systems, which have become widespread in recent years, operations are performed such that when a call-receiving mobile telephone terminal is unable to receive incoming calls due to various circumstances, this information is relayed to the call-making mobile telephone terminal. Specifically, when, as examples of incoming call disablement, a call-receiving mobile telephone terminal is outside of a coverage area or the call-receiving mobile telephone terminal is not switched on, the call-making mobile telephone terminal is informed that "The telephone you have called cannot be reached due to being out of the coverage area or not switched on". When a so-called "driving mode" function is set in the call-receiving mobile telephone terminal, the call-making mobile telephone terminal is informed that "This telephone cannot be reached since the owner is currently driving. Please call again later".

In these cases, the call-making side may leave a message if a so-called answering machine service function, in which messages are received at an answering machine center, or a so-called message noting function, in which messages are recorded on the call-receiving mobile telephone terminal, has been set.

Except in the aforementioned cases, however, when incoming calls are disabled in conventional mobile telephone systems no information is given as to why a user cannot answer a telephone (that is, a reason why an incoming call cannot be received).

A communication system in which, when incoming calls cannot be received, an incoming call is rejected automatically and a reason is given for the incoming call disablement is disclosed in Japanese Patent Application Laid-Open No. H8-251231. In this communication system, however, no information is given as to when the telephone will be able to receive calls (that is, the period of time during which incoming calls will be disabled). In other words, this system makes no distinction between and gives no information concerning a comparatively short call disablement period for reasons such as a user being on a short train ride or in a meeting, for example, and a comparatively long call disablement period for reasons such as a user being out of the coverage area for a long period of time or on an overseas vacation. Hence, the information given to the call-making side concerning the disablement of incoming calls is insufficient.

These problems occur in similar fashion in fixed telephone systems in which communication between a call-receiving fixed telephone terminal and a call-making fixed telephone terminal is performed, or in a combination of a mobile telephone terminal and a fixed telephone terminal.

The present invention has been devised in this context, and it is an object thereof to provide a system and method for providing information concerning incoming call disablement in which, when a call-receiving telephone terminal is unable to receive incoming calls due to various circumstances, a call-making telephone terminal may be provided with information concerning the reason for the call disablement and the period of time during which incoming calls will be disabled.

Another object of the present invention is to provide a system and method for providing information concerning incoming call disablement in which a call-receiving telephone terminal may be provided with the aforementioned information by means of a simple operation.

DISCLOSURE OF THE INVENTION

A first invention is a system for providing information concerning incoming call disablement comprising at least: a call-receiving telephone terminal which is capable of receiving input of a statement explaining a reason for incoming call disablement and a time period of incoming call disablement; storage means for storing the statement explaining a reason for incoming call disablement and the time period of incoming call disablement; and notification means for performing processing to notify a call-making telephone terminal of the statement explaining the reason for incoming call disablement and the time period of incoming call disablement which are stored in the storage means when a call is made from the call-making telephone terminal to the call-receiving telephone terminal at a time which is within the range of the time period of incoming call disablement. According to this system, when a call-receiving telephone terminal is unable to receive incoming calls due to various circumstances, a call-making telephone terminal can be informed of the statement explaining the reason for incoming call disablement and the time period of incoming call disablement which have been inputted into the call-receiving telephone terminal. Thus, the call-making telephone terminal is satisfactorily provided with information concerning the incoming call disablement, and as a result, the convenience of mobile telephone systems and fixed telephone systems is significantly improved.

Here, if a constitution is provided such that the storage means and notification means are provided in the call-receiving telephone terminal, the aforementioned information may be provided from the call-receiving telephone terminal itself. Alternatively, in a case where the call-receiving telephone terminal is a mobile telephone terminal, for example, if a constitution is provided in which the storage means and notification means are communicably connected to a switchboard which performs telephone switching and provided in an answering machine center having a recording device which is capable of recording messages for the call-receiving telephone terminal when the call-receiving telephone terminal is in a state of incoming call disablement, the aforementioned information may be provided from the answering machine center when the mobile telephone terminal is out of the coverage area or when the mobile telephone terminal is not switched on.

If a constitution is provided such that the statement explaining the reason for incoming call disablement is inputted by making a selection from a plurality of preset statements displayed on a display screen provided on the call-receiving telephone terminal, input of the reason for incoming call disablement can be performed by means of a simple operation of the call-receiving telephone terminal.

If a constitution is provided in which a carrier of the call-receiving telephone terminal may set a desired statement as the statement explaining the reason for incoming call disablement, setting of the reason for incoming call disablement may be performed in accordance with the convenience of the call-receiving side.

If a constitution is provided such that the time period of incoming call disablement is inputted by operating a numeric keypad provided on the call-receiving telephone terminal, input of the time period of incoming call disablement can be performed by means of a simple operation of the call-receiving telephone terminal.

If a constitution is provided in which a time period beginning at a time which is in the future of the current time may be set as the time period of incoming call disablement, the setting of future plans may be performed in accordance with the convenience of the call-receiving side. Alternatively, if a constitution is provided in which a fixed daily time period in accordance with the wishes of the carrier of the call-receiving telephone terminal may be set as the time period of incoming call disablement, a call disablement time period which covers afternoon work time can be set when the call-receiving telephone terminal is individually-owned, whereby work disturbances can be avoided, and a call disablement time period which covers private evening time can be set when the call-receiving telephone terminal is company-owned, whereby private use can be curbed.

If a constitution is provided such that a plurality of statements and time periods may be set as the statement explaining the reason for incoming call disablement and the time period of incoming call disablement, a plurality of reasons for and time periods of incoming call disablement can be set in accordance with the convenience of the call-receiving side.

If a constitution is provided in which the call-receiving telephone terminal is capable of receiving input of an amount of time of incoming call disablement and comprises calculation means which calculate the time from which incoming calls may be received on the basis of this amount of time of incoming call disablement, and in which the storage means store, as the time period of incoming call disablement, the period from the time of input reception of the amount of time of incoming call disablement (or in other words the current time) to the time from which incoming calls may be received, setting of the time period of incoming call disablement may be performed by means of a simple operation of merely inputting the amount of time of incoming call disablement into the call-receiving telephone terminal.

If a constitution is provided in which the notification means perform processing to provide notification of the statement explaining the reason for incoming call disablement and the time period of incoming call disablement by means of an automatic voice message, the aforementioned information may be provided even when the call-making telephone terminal does not have a display screen (in the case of a fixed telephone terminal, for example).

If a constitution is provided such that the notification means perform processing to provide notification of the statement explaining the reason for incoming call disablement and the time period of incoming call disablement by means of alphanumeric information, the information can be securely provided since the statement explaining the reason for incoming call disablement and the time period of incoming call disablement are notified by means of alphanumeric information.

If a constitution is provided such that the call-receiving telephone terminal is capable of receiving input of a notification condition under which notification is performed, and such that the notification means perform processing to notify the call-making telephone terminal of the statement explaining the reason for incoming call disablement and the time period of incoming call disablement, which are stored in the storage means, when the notification condition is satisfied, notification is not performed indiscriminately and notifications of reasons, time periods and the like which concern the privacy of the user, for example, can be prevented.

A second invention is a method of providing information concerning incoming call disablement, comprising at least the steps of: receiving input of a statement explaining a reason for incoming call disablement and a time period of incoming call disablement from a call-receiving telephone terminal; storing the statement explaining the reason for incoming call disablement and the time period of incoming call disablement; and performing processing for notifying a call-making telephone terminal of the statement explaining the reason for incoming call disablement and the time period of incoming call disablement, which are stored in storage means, when a call is made from the call-making telephone terminal to the call-receiving telephone terminal at a time which is within the range of the time period of incoming call disablement. According to this method, when a call-receiving telephone terminal is unable to receive incoming calls due to various circumstances, a call-making telephone terminal can be informed of the statement explaining the reason for incoming call disablement and time period of incoming call disablement which have been inputted into the call-receiving telephone terminal. Thus, the call-making telephone terminal is satisfactorily provided with information concerning the incoming call disablement, and as a result, the convenience of mobile telephone systems and fixed telephone systems is significantly improved.

BEST MODE FOR CARRYING OUT THE INVENTION

Embodiments of the present invention will be described below with reference to the drawings.

[1. Constitution of the System for Providing Information Concerning Incoming Call Disablement.]

Figure 1:
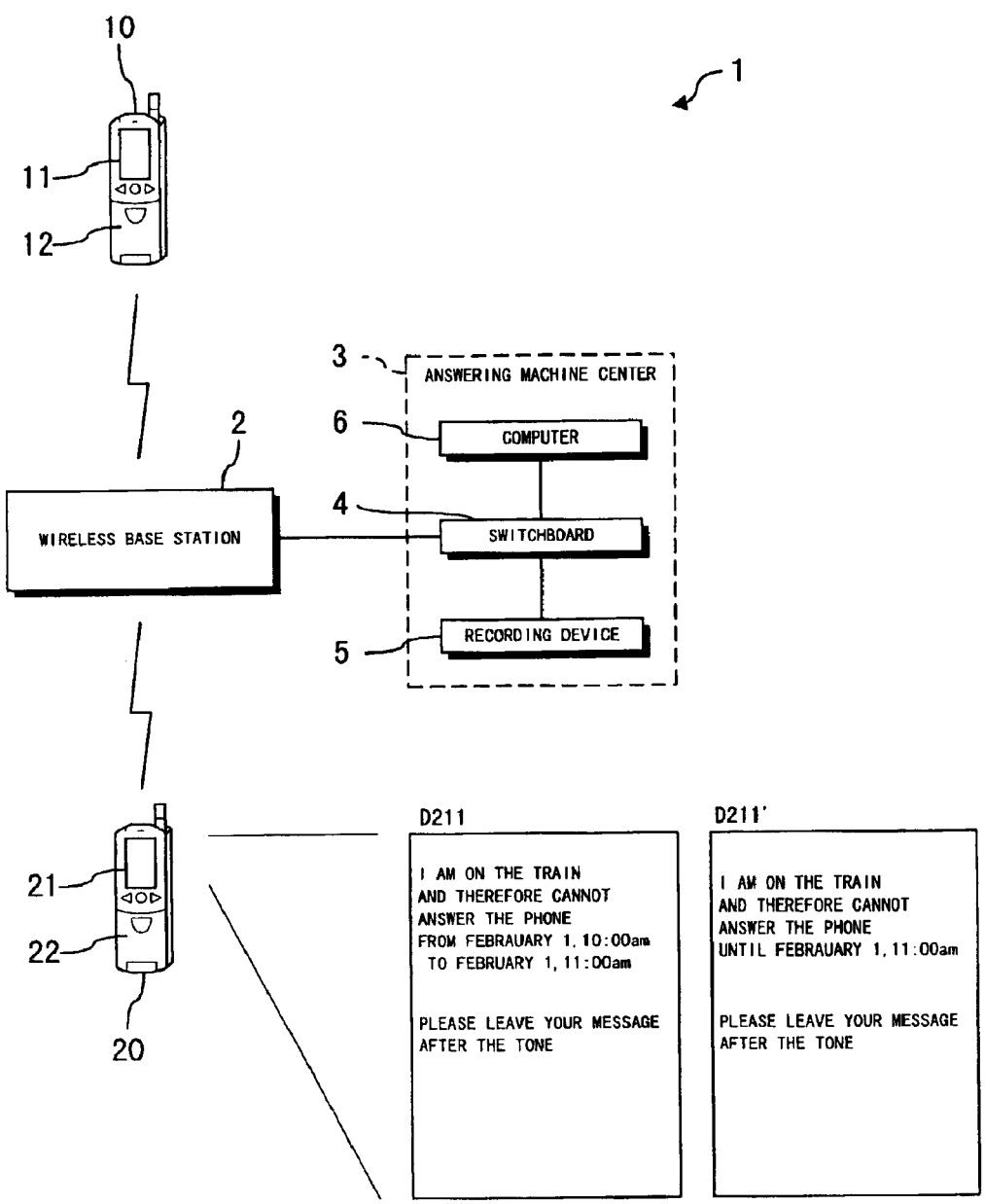
FIG. 1 is a functional block diagram showing an example of a system for providing information concerning incoming call disablement.

First, the constitution of a system for providing information concerning incoming call disablement 1 according to the present invention will be described. FIG. 1 is a functional block diagram showing an example of the system for providing information concerning incoming call disablement 1. Explanations will be given considering a case in which the call-receiving telephone terminal is a mobile telephone terminal (referred to hereafter as "call-receiving mobile telephone terminal 10") and the call-making telephone terminal is a mobile telephone terminal (referred to hereafter as "call-making mobile telephone terminal 20"), or in other words a case in which the present invention is applied to a mobile telephone system.

As is illustrated in FIG. 1, the system for providing information concerning incoming call disablement 1 is comprised of a wireless base station 2, an answering machine center 3 equipped with a switchboard 4, a recording device 5, and a computer 6, a call-receiving mobile telephone terminal 10, and a call-making mobile telephone terminal 20. The system for providing information concerning incoming call disablement 1 also includes storage means and notification means which, in the system for providing information concerning incoming call disablement 1 according to a first embodiment, are provided in the call-receiving mobile telephone terminal 10, and in the system for providing information concerning incoming call disablement 1 according to a second embodiment, are provided in the computer 6. Further, in the system for providing information concerning incoming call disablement 1 according to a modified example in which the method of setting the time during which incoming calls will be disabled is different to that of the first and second embodiments, calculation means are provided in the call-receiving mobile telephone terminal 10.

Here, the storage means are for storing a statement which explains the reason why incoming calls are disabled and a period of time during which incoming calls will be disabled, which are inputted through the call-receiving mobile telephone terminal 10. In the first embodiment, these storage means are EEPROM (to be described hereinbelow) provided in the call-receiving mobile telephone terminal 10, and in the second embodiment are a hard disk (to be described hereinbelow) provided in the computer 6.

The notification means perform processing to notify the call-making mobile telephone terminal 20 of the statement explaining the reason why incoming calls are disabled and the time period during which incoming calls will be disabled, which are stored in the storage means, when a call is made from the call-making mobile telephone terminal 20 to the call-receiving mobile telephone terminal 10 at a time which is within the range of the time period during which incoming calls are disabled. In the first embodiment, these notification means are a CPU (to be described hereinbelow) provided in the call-receiving mobile telephone terminal 10, and in the second embodiment are a CPU (to be described hereinbelow) provided in the computer 6. Notification of the statement explaining the reason why incoming calls are disabled and the time period during which incoming calls will be disabled is performed under the control of these CPUs by operations of automatic speech synthesis means in which notification is given in an automatic voice message, or electronic mail transmission means in which notification is given in alphanumeric information.

The calculation means according to the modified example calculate the time from which incoming calls may be received on the basis of an amount of time, inputted through the call-receiving mobile telephone terminal 10, for which incoming calls will be disabled. Specifically, as is shown in D118' of FIG. 5 (to be described hereinbelow), if the current time is 9:30 am and an amount of time for which incoming calls will be disabled of one hour and thirty minutes is inputted, the calculation means calculate the time from which incoming calls may be received again to be 11:00 am. These calculation means are a CPU (to be described hereinbelow) provided in the call-receiving mobile telephone terminal 10. Further, the period from input reception of the amount of time for which incoming calls will be disabled (9:30 am in this case) to the time from which incoming calls may be received again (11:00 am in this case) is stored in the storage means as the time period during which incoming calls will be disabled.

The constitution of each element will be described below. As is illustrated in FIG. 1, the wireless base station 2 performs communication with the call-receiving mobile telephone terminal 10 or the call-making mobile telephone terminal 20. The switchboard 4 is connected to the wireless base station 2 outside of the answering machine center 3 or a relay switchboard of a subscriber line telephone network (not shown in the drawing) or the like, and is also connected to the recording device 5 inside the answering machine center 3, the computer 6, and so on, and is a device for selecting a line from the telephone number and connecting the line. The recording device 5 is also capable of recording messages for the call-receiving mobile telephone terminal 10 when the terminal is in a state of incoming call disablement. The wireless base station 2, switchboard 4, and recording device 5 are all commonplace devices.

The computer 6 is a commonplace device comprising a central calculation processing device (CPU) equipped with a calculation function, RAM equipped with a memory function, ROM in which a prescribed program is recorded, a hard disk which is a mass-storage device (none of which are shown in the drawings), and so on. In the second embodiment, the hard disk functions as the storage means, and the CPU functions as the notification means.

The call-receiving mobile telephone terminal 10 is a commonplace device comprising the aforementioned CPU, RAM and ROM, and EEPROM or the like which is a nonvolatile semiconductor storage element, (none of which are shown in the drawings). In the first embodiment, the EEPROM functions as the storage means and the CPU functions as the notification means. In the modified example, the CPU functions as the calculation means.

The call-receiving mobile telephone terminal 10 is capable of receiving input of the statement explaining why incoming calls are disabled and the time period during which incoming calls will be disabled. The former is inputted by selecting a statement from a plurality of preset statements displayed on a display screen 11 provided on the call-receiving mobile telephone terminal 10, as is shown in D114 and D115 in FIG. 3 (to be described hereinbelow), or by means of the carrier of the call-receiving mobile telephone terminal 10 inputting a desired statement, as is shown in D116 also in FIG. 3. The latter is inputted by operating a numeric keypad (not shown in the drawing) which is provided on the call-receiving mobile telephone terminal 10 and exposed when a sliding cover 12 is caused to slide downward. In the call-receiving mobile telephone terminal 10 according to the modified example, input reception of the amount of time for which incoming calls will be disabled is also possible in addition to the time period during which incoming calls will be disabled (refer to D118' in FIG. 5 below).

The call-receiving mobile telephone terminal 10 is also capable of receiving input of a notification condition under which the statement explaining why incoming calls are disabled and time period during which incoming calls will be disabled are notified (refer to D113 in FIG. 2 below). Here, "notification condition" signifies a case in which, for example, the telephone number of the call-making mobile telephone terminal 20 is stored in the memory of the call-receiving mobile telephone terminal 10, or in which a preset, predetermined security code number is inputted from the call-making mobile telephone terminal 20, or similar.

Notification conditions are not limited to these examples, and telephone numbers which are to be notified may be recorded each time a reason and time period [are set], or the security code number may be modified each time a reason and time period [are set], for example.

The call-making mobile telephone terminal 20 is a commonplace device similar to the call-receiving mobile telephone terminal 10, and in this case is provided with a display screen 21 which is capable of displaying as alphanumeric information the statement explaining why incoming calls are disabled and the time period during which incoming calls will be disabled, as is shown in D211 or D211' in FIG. 1.

[2. Operation of the System for Providing Information Concerning Incoming Call Disablement.]

The operation of the system for providing information concerning incoming call disablement 1 (or in other words the method of providing information concerning incoming call disablement) according to the present invention will now be described. Here, FIGS. 2 through 5 are views showing an example of the display content which is displayed on the display screen 11 of the call-receiving mobile telephone terminal 10. Below, the system for providing information concerning incoming call disablement 1 according to both the first and second embodiments will first be described, after which the system for providing information concerning incoming call disablement 1 according to a modified example in which the method of setting the time period during which incoming calls will be disabled differs from that of the first and second embodiments will be described. Note that steps in the modified example which differ from the first and second embodiments are illustrated with an inverted comma attached ( '), and that duplicate explanations of identical steps have been omitted.

[2.1 The System for Providing Information Concerning Incoming Call Disablement According to the First and Second Embodiments.]

Figure 2:
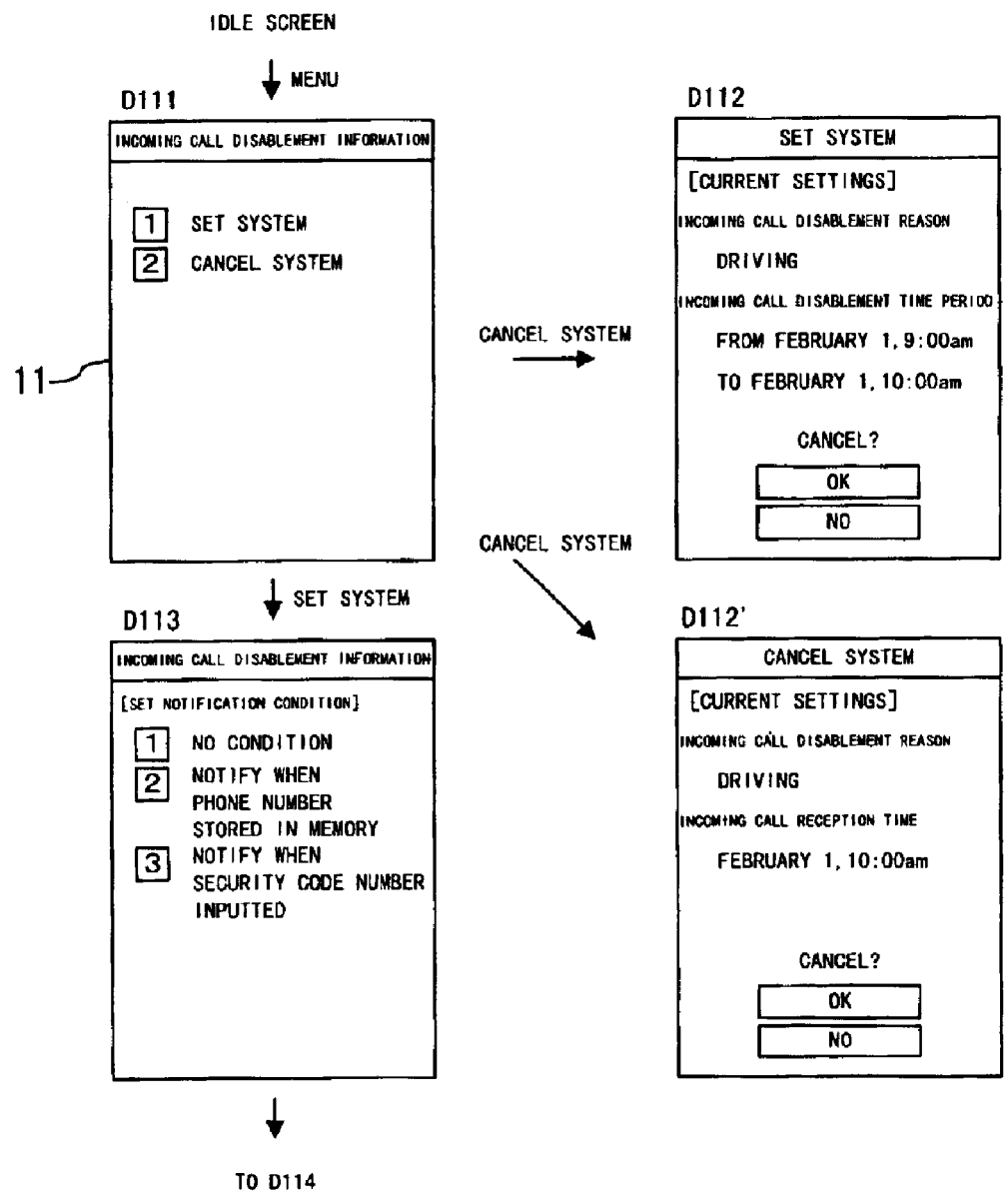
FIG. 2 is a view showing an example of the display content which is displayed on a display screen of a call-receiving mobile telephone terminal.
Figure 3:
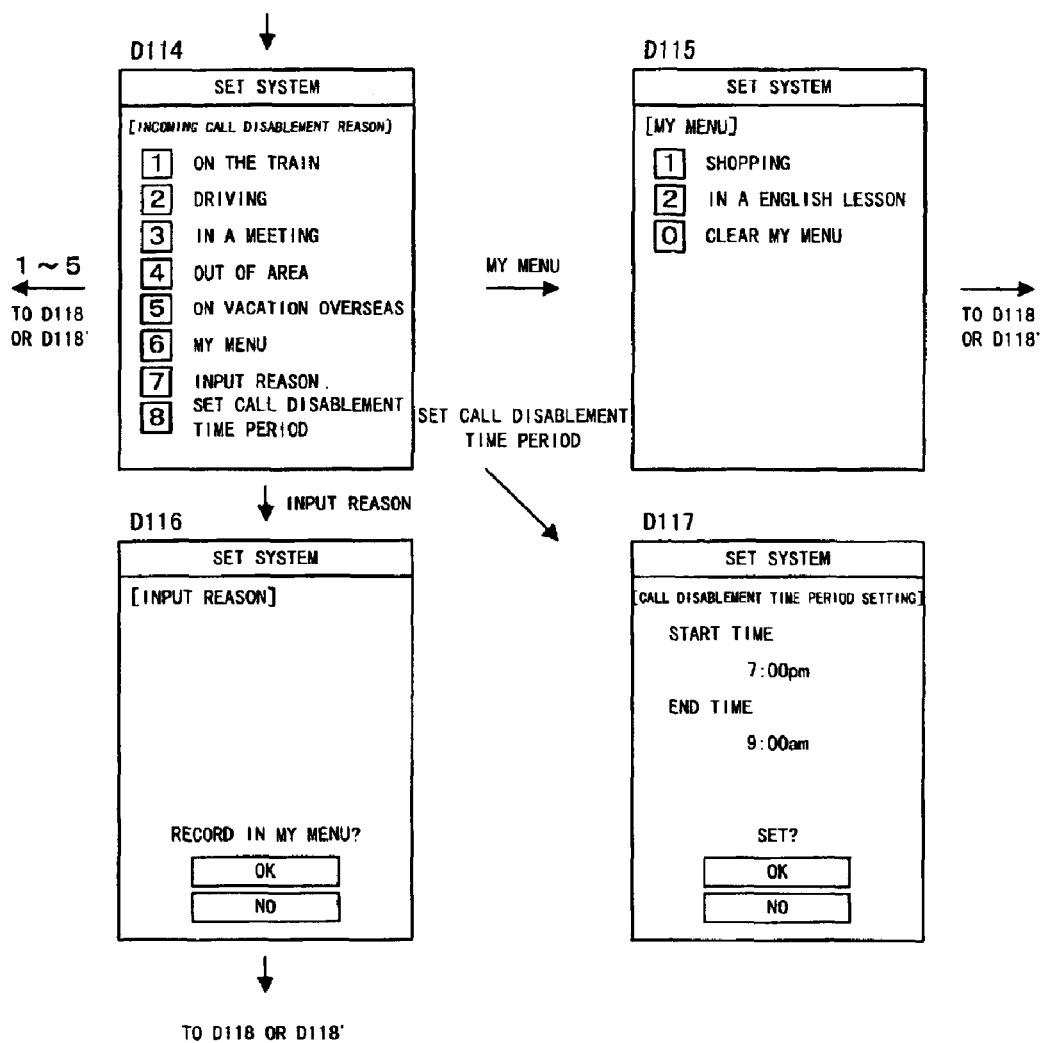
FIG. 3 is a view in continuation of FIG. 2.
Figure 4:
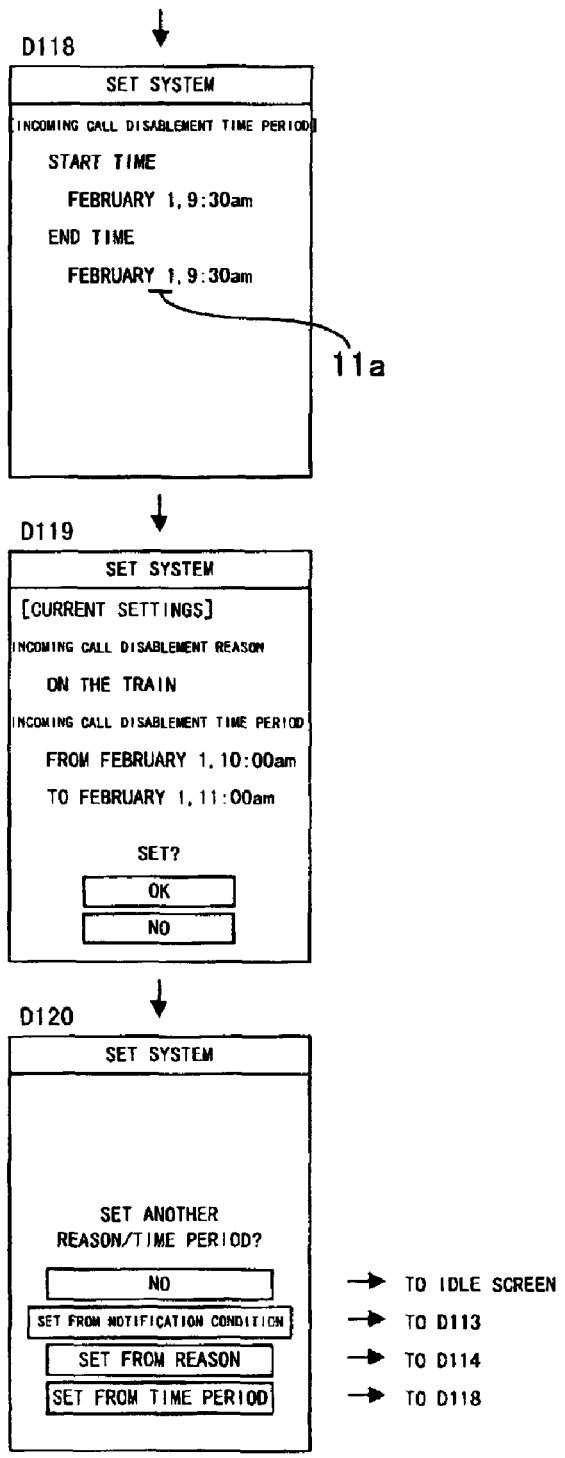
FIG. 4 is a view in continuation of FIG. 3.

In the system for providing information concerning incoming call disablement 1 according to the first and second embodiments, the screens shown in FIGS. 2 to 4 are displayed on the display screen 11 of the call-receiving mobile telephone terminal 10. Setting of the statement explaining why incoming calls are disabled (to be referred to hereafter as "reason for incoming call disablement") is performed by means of a predetermined operation of the call-receiving mobile telephone terminal 10 (here, selection is performed by operating a cross-shaped key, input is performed by operating the numeric keypad, and determination is performed by operating a return key), and setting of the time period during which incoming calls will be disabled (to be referred to hereafter as "time period of incoming call disablement") is also performed by means of a predetermined operation of the call-receiving mobile telephone terminal 10 (here, selection is performed by operating the cross-shaped key, input is performed by operating the numeric keypad, and determination is performed by operating the return key).

Specifically, if a menu button (not shown) is operated in order to select a mode for providing information concerning incoming call disablement when an idle screen (not shown in the drawings) is displayed on the display screen 11, a screen which prompts the user to select system setting or system cancellation will be displayed as in D111 in FIG. 2.

When an operation to select "system cancellation" is performed in D111, the current setting is displayed as in D112. If an operation to select "OK" is performed, the currently set reason for incoming call disablement and time period of incoming call disablement are cancelled and D111 is returned to. If an operation to select "No"$^i$ is performed, the procedure returns to D111 without canceling these settings. Thus, when a state of incoming call disablement is released in the call-receiving mobile telephone terminal 10, the carrier of the call-receiving mobile telephone terminal 10 performs the operation him/herself, whereby these settings can be immediately cancelled.

On the other hand, if an operation to select "system setting" is performed in D111, a screen prompting the user to set a notification condition is displayed as in D113. If an operation to select "notify when telephone number is stored in memory" as a notification condition is performed in D113, setting is conducted such that processing to notify the call-making mobile telephone terminal 20 of the amount of time for which incoming calls will be disabled$^{ii}$ and time period of incoming call disablement is performed when the telephone number of the call-making mobile telephone terminal 20 is stored in the memory of the call-receiving mobile telephone terminal 10, whereupon the procedure advances to D114. If an operation is performed in D113 to select "notify when security code number is inputted" as a notification condition, setting is conducted such that processing to notify the call-making mobile telephone terminal 20 of the amount of time for which incoming calls will be disabled$^{ii}$ and time period of incoming call disablement is performed when a preset, predetermined security code number is inputted from the call-making mobile telephone terminal 20, whereupon the procedure advances to D114.

Thus, notification of the reason for incoming call disablement and the time period of incoming call disablement is performed on the basis of the notification conditions inputted through the call-receiving mobile telephone terminal 10. Hence, notification is not performed indiscriminately and notification of reasons and time periods concerning the privacy of the user, for example, can be prevented. If an operation to select "no condition" is performed, no notification conditions are set and the procedure advances to D114.

Moving to FIG. 3, a screen is displayed in D114 which prompts the user to select a reason for incoming call disablement from among a plurality of preset statements. When an operation to select one of "on the train", "driving", "in a meeting", "out of area", or "on vacation overseas" is performed, setting of the appropriate reason for incoming call disablement is performed and the procedure advances to D118. Thus, by means of a simple operation of the call-receiving mobile telephone terminal 10, setting of the reason for incoming call disablement can be performed. Note that the preset reasons for incoming call disablement are not limited to the aforementioned examples.

Further, if an operation to select "my menu" is performed in D114, a screen prompting the user to select a reason for incoming call disablement from among a plurality of statements recorded in advance is displayed in D115 as a "my menu" of statements determined by the carrier of the call-receiving mobile telephone terminal 10. When an operation to select one of "shopping" or "in an English lesson" is performed in D115, setting of the appropriate reason for incoming call disablement is performed and the procedure advances to D118. Thus, by means of a simple operation of the call-receiving mobile telephone terminal 10, setting of a reason for incoming call disablement which suits the convenience of the call-receiving side can be performed. Note that the reasons for incoming call disablement recorded as "my menu" are not limited to the aforementioned examples.

If an operation to select "clear my menu" is performed in D115, the reasons for incoming call disablement recorded in "my menu" may be deleted.

When an operation to select "input reason" is performed in D114, a screen enabling the owner of the call-receiving mobile telephone terminal 10 to set a desired statement is displayed as in D116. Input of a reason for incoming call disablement is performed in D116 by operating the numeric keypad (not shown), and when an operation to select "OK" is performed, the inputted reason for incoming call disablement is recorded in "my menu" and setting of this reason for incoming call disablement is performed, after which the procedure advances to D118. When an operation to select "No"$^i$ is performed, setting of the inputted reason for incoming call disablement is performed without recording this reason for incoming call disablement in "my menu", whereupon the procedure advances to D118. Thus, setting of a reason for incoming call disablement may be performed in accordance with the convenience of the call-receiving side.

When an operation to select "set call disablement time period" is performed in D114, a screen is displayed as in D117 on which a fixed daily time period (to be referred to hereafter as "call disablement time period") can be set as desired by the carrier of the call-receiving mobile telephone terminal 10 as a time period of incoming call disablement. Input of this call disablement time period (which in this case is private evening time from 7:00 pm to 9:00 am) is performed in D117 by operating the numeric keypad (not shown). When an operation to select "OK" is performed, the inputted call disablement time period is set and the procedure returns to D114, whereas if an operation to select "No"$^i$ is performed, the procedure returns to D114 without setting the inputted call disablement time period.

Thus, for example, when the call-receiving mobile telephone terminal 10 is an individually-owned device, a call disablement time period which covers afternoon work time can be set, whereby work disturbances can be avoided. When the call-receiving mobile telephone terminal 10 is a company-owned device, a call disablement time period which covers private evening time can be set, whereby private use can be curbed. Note that in the latter case, a function for restricting the cancellation of the call disablement time period setting (for example registration of the cancellation key) may be added so that the aforementioned individual is unable to cancel the settings and only the aforementioned company is able to cancel the settings. In so doing, private use is restricted even further.

Moving to FIG. 4, in D118, which has been advanced to from one of D114 to D116, a screen which prompts the user to input the time period of incoming call disablement is displayed. Specifically, the current time (in this case February 1, 9:30 am) is displayed in both the start time and end time lines of the time period of incoming call disablement, and a cursor 11a indicating that input reception is possible is displayed in the hour column of the end time. Here, input reception of the month, day, hour and minute of the start time and end time is possible by moving the cursor 11a to each column by means of an operation of the cross-shaped key (not shown). A desired number is inputted into each column by operating the numeric keypad (not shown), and the number inputted into each column is fixed by operating the return key (not shown), whereupon the procedure advances to D119. Thus, setting of the time period of incoming call disablement may be performed by means of a simple operation of the call-receiving mobile telephone terminal 10.

In D118, the current time (in this case February 1, 9:30 am) is displayed in both the start time and end time lines of the time period of incoming call disablement, and thus the cursor 11a does not have to be moved to the start time line when a time period of incoming call disablement which will begin from the current time is to be set. As a result, input of the time period of incoming call disablement is possible with a brief operation. Note that the time which is displayed in the start time and end time lines is not limited to the current time.

Also in D118, the cursor 11a is displayed in the hour column of the end time, and therefore, when a time period of incoming call disablement is to be set for the same day, this setting generally being frequently used, the cursor 11a need only be moved to the hour and minute columns of the end time without being moved to the month and day columns. As a result, input of the time period of incoming call disablement is possible with a brief operation. Note that the displayed position of the cursor 11a is not limited to the hour column of the end time.

Moreover in D118, a time period which begins from a future time may be set as the time period of incoming call disablement by moving the cursor 11a to the start time line and inputting a time (for example February 1, 10:00 am) which is in the future of the current time (in this case February 1, 9:30 am). Thus, future plans can be set in accordance with the convenience of the call-receiving side.

In D119 the current settings are displayed, these being the reason for incoming call disablement (in this case "on the train") which was set in one of D114 to D116 and the time period of incoming call disablement (in this case February 1, 10:00 am to February 1, 11:00 am) which was inputted in D118, and a screen which prompts the user to confirm or cancel these settings is also displayed. When an operation to select "OK" is performed in D119, the set reason for incoming call disablement and time period of incoming call disablement are temporarily stored in the RAM of the call-receiving mobile telephone terminal 10, whereupon the procedure advances to D120. When an operation to select "No"$^i$ is performed in D119, the set reason for incoming call disablement and time period of incoming call disablement are not stored and the procedure returns to D111.

In D120 a screen which prompts the user to choose whether or not to set another reason for incoming call disablement and time period of incoming call disablement is displayed. When an operation to select "Set from reason" is performed in D120, the procedure returns to D114, wherein a different reason for incoming call disablement and time period of incoming call disablement is set. When an operation to select "set from time period" is performed in D120, the procedure returns to D118, wherein the previously set reason for incoming call disablement and a different time period of incoming call disablement are set. It is thus possible for a plurality of reasons for incoming call disablement and time periods of incoming call disablement to be set in accordance with the convenience of the call-receiving side. Note that when an operation to select "No" is performed in D120, an idle screen is displayed on the display screen 11 and the procedure advances to the storage and notification steps (not shown) to be described hereinbelow.

First, when an operation to select "No" is performed in D120 in the system for providing information concerning incoming call disablement 1 according to the first embodiment, the reason for incoming call disablement and time period of incoming call disablement that are temporarily stored in the RAM of the call-receiving mobile telephone terminal 10 are stored in the EEPROM of the call-receiving mobile telephone terminal 10.

Here, when a call from the call-making mobile telephone terminal 20 to the call-receiving mobile telephone terminal 10 is made at a time (for example 10:30 am) which is within the range of the time period of incoming call disablement, and when no notification conditions are set, the reason for incoming call disablement and time period of incoming call disablement stored in the EEPROM are transmitted from the call-receiving mobile telephone terminal 10 and notified to the call-making mobile telephone terminal 20. In the notification-receiving call-making mobile telephone terminal 20, these notifications are received by automatic voice message, and are also received as alphanumeric information which is displayed on the display screen 21 as shown in D211 of FIG. 1.

When an operation to select "No" is performed in D120 in the system for providing information concerning incoming call disablement 1 according to the second embodiment, the reason for incoming call disablement and time period of incoming call disablement which are temporarily stored in the RAM of the call-receiving mobile telephone terminal 10 are transmitted from the call-receiving mobile telephone terminal 10 to the answering machine center 3 via the wireless base station 2 and stored on the hard disk of the computer 6.

Here, when a call from the call-making mobile telephone terminal 20 to the call-receiving mobile telephone terminal 10 is made at a time (for example 10:30 am) which is within the range of the time period of incoming call disablement, and when no notification conditions are set, the reason for incoming call disablement and time period of incoming call disablement which are stored on the hard disk of the computer 6 are transmitted from the answering machine center 3 and notified to the call-making mobile telephone terminal 20 via the wireless base station 2. In the notification-receiving call-making mobile telephone terminal 20, these notifications are received by automatic voice message, and are also received as alphanumeric information which is displayed on the display screen 21 as shown in D211 of FIG. 1.

When a notification condition is set in the system for providing information concerning incoming call disablement 1 according to the first or second embodiment, notification of the reason for incoming call disablement and time period of incoming call disablement is not performed immediately even if the time at which a call was made from the call-making mobile telephone terminal 20 to the call-receiving mobile telephone terminal 10 (for example 10:30am) is within the range of the time period of incoming call disablement.

If the telephone number of the call-making mobile telephone terminal 20 is stored in the memory of the call-receiving mobile telephone terminal 10 when the notification condition ""notify when telephone number is stored in memory" is set, the reason for incoming call disablement and time period of incoming call disablement are notified to the call-making mobile telephone terminal 20 by automatic voice message and also as alphanumeric information which is displayed on the display screen 21 as is illustrated in D211 of FIG. 1. If, however, the telephone number is not stored in memory, notification is not performed and a message which simply says "the user is unavailable" is relayed to the call-making mobile telephone terminal 20 by automatic voice message and displayed on the display screen 21. A constitution is also possible in which, when a telephone number is not stored in memory, the message saying "the user is unavailable" is not displayed and processing is performed in a similar manner to a case in which "notify when security code number is inputted", to be explained hereinbelow, is set.

When "notify when security code number is inputted" is set as a notification condition, an automatic voice message saying "Please input security code number" is relayed to the call-making mobile telephone terminal 20 and displayed on the display screen 21. When a predetermined security code number is inputted from the call-making mobile telephone terminal 20, the reason for incoming call disablement and time period of incoming call disablement are notified to the call-making mobile telephone terminal 20 by automatic voice message and displayed as alphanumeric information on the display screen 21 as shown in D211 of FIG. 1. When the security code number is not inputted or an incorrect security code number is inputted, notification is not performed and a message simply saying "the user is unavailable" is relayed by automatic voice message and displayed on the display screen 21.

If setting for an answering machine service function has been performed in the call-receiving mobile telephone terminal 10, messages inputted from the call-making mobile telephone terminal 20 can be stored in the recording device 5, and if setting for a message noting function has been performed, messages inputted from the call-making mobile telephone terminal 20 can be recorded in the EEPROM of the call-receiving mobile telephone terminal 10. Further, when a call is made from the call-making mobile telephone terminal 20 to the call-receiving mobile telephone terminal 10 within the range of the time period of incoming call disablement, a record of the call is stored in the EEPROM.

In both the first and second embodiments, when the time period of incoming call disablement has passed, the system is automatically cancelled. Specifically, in the first embodiment the reason for incoming call disablement, time period of incoming call disablement, notification conditions and so on which are stored in the EEPROM of the call-receiving mobile telephone terminal 10 are deleted, and in the second embodiment, the reason for incoming call disablement, time period of incoming call disablement, notification conditions and so on which are stored on the hard disk of the computer 6 are deleted. Note, however, that the call disablement time period set in D117 is not automatically cancelled.

[2.2 The System for Providing Information Concerning Incoming Call Disablement according to a Modified Example.]

Figure 5:
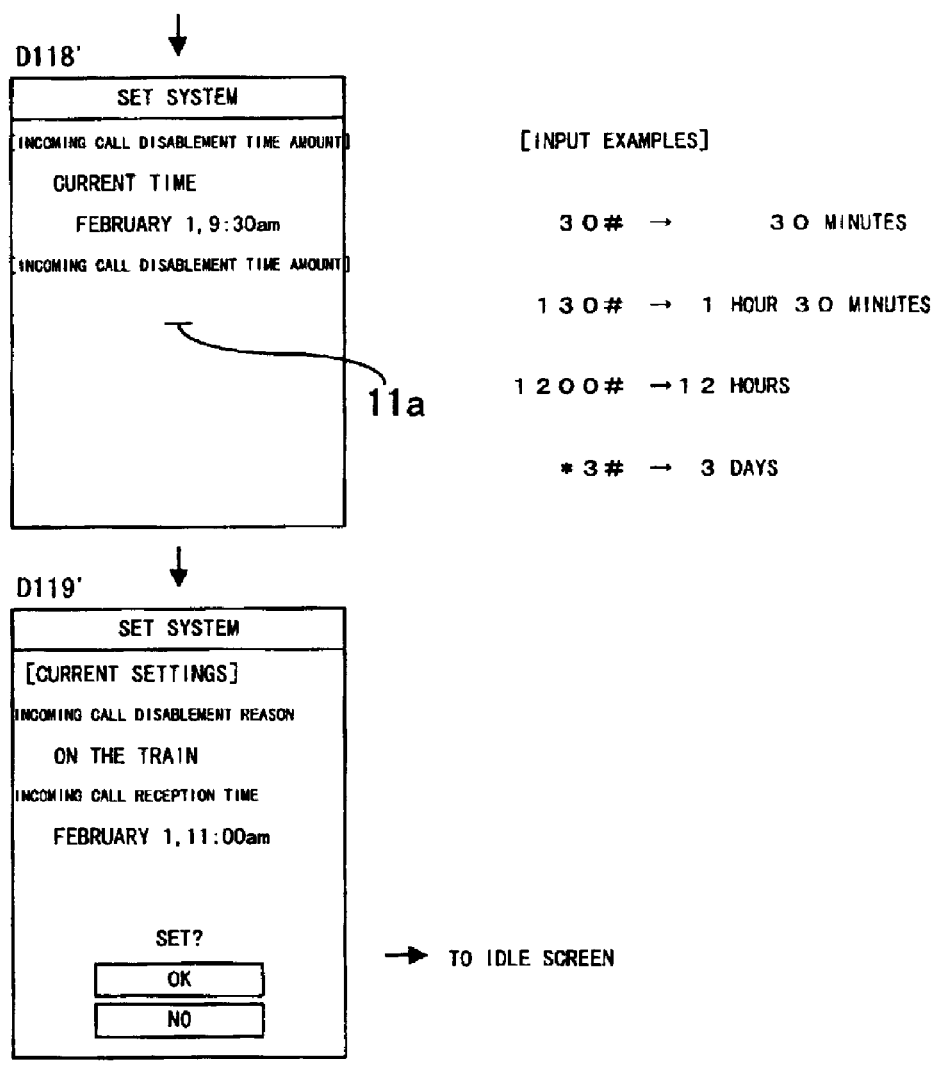
FIG. 5 is a view in continuation of FIG. 3.

In the system for providing information concerning incoming call disablement 1 according to a modified example, the screens shown in FIGS. 2, 3 and 5 are displayed on the display screen 11 of the call-receiving mobile telephone terminal 10. The setting of the reason for incoming call disablement and call disablement time period is performed in a similar fashion to that of D111 through D117, by means of a predetermined operation of the call-receiving mobile telephone terminal 10 (for example, selection by an operation of the cross-shaped key, input by an operation of the numeric keypad, and determination by an operation of the return key, or the like), and the setting of the time period of incoming call disablement as illustrated in D118' to D119', to be described hereinbelow, is performed by means of a predetermined operation of the call-receiving mobile telephone terminal 10 (in this case input by an operation of the numeric keypad only).

Note that when an operation is performed in D111 to select "system cancellation", the current settings are displayed in D112' instead of D112, and when an operation to select "OK" is performed, setting of the current reason for incoming call disablement and time at which incoming calls may be received (to be referred to hereafter as "incoming call reception time") is cancelled and the procedure returns to D111. Further, when an operation is performed to select "No"$^i$, the procedure returns to D111 without canceling these settings.

Moving to FIG. 5, in D118', which was advanced to from one of D114 through D116, a screen is displayed which prompts the user to input an amount of time for which incoming calls will be disabled (to be referred to hereafter as "amount of time of incoming call disablement"). Specifically, the current time (in this case February 1, 9:30 am) is displayed and the aforementioned cursor 11a is displayed in the amount of time of incoming call disablement column. Here, desired numbers are inputted into the amount of time of incoming call disablement by operating the numeric keypad (not shown), whereupon the procedure advances to D119'. Thus, by performing the simple operation of merely inputting the amount of time of incoming call disablement into the call-receiving mobile telephone terminal 10, setting of the amount of time of incoming call disablement, which forms the basis for calculation of the incoming call reception time, can be performed.

In D118', when "30#", for example, is inputted by an operation of the numeric keypad, an amount of time of incoming call disablement of 30 minutes is set; when "130#" is inputted, an amount of time of incoming call disablement of 1 hour and 30 minutes is set; when "1200#" is inputted, an amount of time of incoming call disablement of 12 hours is set; and when "★3#" is inputted, an amount of time of incoming call disablement of 3 days is set.

In D119', the current settings are displayed, these being the reason for incoming call disablement (in this case "on the train") for which setting was performed in one of D114 through D116, and the incoming call reception time (in this case February 1, 11:00 am) which was calculated by adding the amount of time of incoming call disablement inputted in D118' to the current time. Also, a screen which prompts the user to choose whether or not to fix these settings is displayed. When an operation to select "OK" is performed in D119', the idle screen is displayed on the display screen 11 and the reason for incoming call disablement and time period of incoming call disablement (which in this case is the period from the time of input reception of the amount of time of incoming call disablement (in other words the current time) to the incoming call reception time) are temporarily stored in the RAM of the call-receiving mobile telephone terminal 10, whereupon the procedure advances to the aforementioned storage and notification steps (not shown). When an operation to select "No"$^i$ is performed in D119', the set reason for incoming call disablement and time period of incoming call disablement are not stored and the procedure returns to D111.

Thereafter, the storage and notification steps are performed, whereupon the call-making mobile telephone terminal 20 receives notification of the reason for incoming call disablement and time period of incoming call disablement by automatic voice message and also as alphanumeric information which is displayed on the display screen 21 as illustrated in D211' in FIG. 1. Processing to set a notification condition and automatic system cancellation processing when the time period of incoming call disablement has passed are similar to the first and second embodiments.

[3. Other Embodiments of the System for Providing Information Concerning Incoming Call Disablement]

Finally, other embodiments of the system for providing information concerning incoming call disablement 1 according to the present invention will be described.

Firstly, the present invention is similarly applicable to a case in which fixed telephone terminals (typical installed telephone terminals) are used as the telephone terminals of both the call-receiving side and call-making side (or in other words a fixed telephone system), and is also similarly applicable to a case in which one of the telephone terminals of the call-receiving side and the call-making side is a mobile telephone terminal and one of the telephone terminals of the call-receiving side and the call-making side is a fixed telephone terminal.

Accordingly, in an example where the call-receiving side is a fixed telephone terminal, the system for providing information concerning incoming call disablement 1 and method for providing information concerning incoming call disablement are constituted such that when the call-receiving fixed telephone terminal is unable to receive incoming calls due to various circumstances such as being out shopping, in a meeting, or on vacation overseas, a simple operation is performed in the call-receiving fixed telephone terminal in a similar manner to that described above, whereby a call-making telephone terminal (either fixed or mobile) is provided with information concerning the reason for incoming call disablement and time period of incoming call disablement, and whereby the system is automatically cancelled when the time period of incoming call disablement has passed.

The present invention is also applicable to a case in which the call-receiving mobile telephone terminal 10 and the call-making mobile telephone terminal 20 are Personal Handyphone Systems (so-called PHS).

In the above embodiments, an example was described in which the reason for incoming call disablement and time period of incoming call disablement were inputted by means of a predetermined operation of the call-receiving mobile telephone terminal 10 (for example selection by an operation of the cross-shaped key, input by an operation of the numeric keypad, determination by an operation of the return key, and so on). However, the present invention is not limited thereto, and may be constituted such that this input is received through a voice and converted into alphanumeric characters using voice recognition software.

Further, an example was described in the above embodiments in which the call-making mobile telephone terminal 20 was notified of the reason for incoming call disablement and time period of incoming call disablement by means of both automatic voice message and alphanumeric information. However, the present invention is not limited thereto, and may be constituted such that notification is given either by automatic voice message or alphanumeric information alone.

In the second embodiment, an example was described in which the answering machine center was provided with storage means and notification means. However, the present invention is not limited thereto and may be constituted such that these means are provided, for example, in a telephone company or another third-party institution.

Also in the above embodiments, an example was described in which setting of the notification condition is prompted in D113 and setting of the plurality of reasons for incoming call disablement and the time period of incoming call disablement is prompted in D120. However, the present invention is not limited thereto and, in order to simplify operations, may be constituted such that these settings are performed separately on a master menu screen provided in the call-receiving mobile telephone terminal 10, and such that a screen prompting these settings is not displayed during normal operations.

It is also possible to provide a constitution in which a user may switch between direct input of the time period of incoming call disablement, as in the first and second embodiments, and calculation of the incoming call reception time following input of the amount of time of incoming call disablement, as in the modified example, by means of a predetermined operation on a master menu screen provided in the call-receiving mobile telephone terminal 10.

Note that in the above embodiments, a message which simply indicates that incoming calls cannot be received may be set instead of setting the reason for incoming call disablement and time period of incoming call disablement. If such setting is performed, the reason for incoming call disablement and time period of incoming call disablement are not specified and information such as "the phone cannot be answered due to various circumstances", for example, is provided.

INDUSTRIAL APPLICABILITY

As described above, the system and method for providing information concerning incoming call disablement according to the present invention may be used in a mobile telephone system or fixed telephone system as a system and method for significantly improving the convenience of mobile telephone systems or fixed telephone systems by enabling information concerning incoming call disablement to be satisfactorily provided to a call-making telephone terminal when a call-receiving telephone terminal is unable to receive incoming calls due to various circumstances.

What is claimed is:

1. A system for providing information concerning incoming call disablement comprising at least:
   a call-receiving telephone terminal equipped with a display screen which is capable of displaying a plurality of preset statements which explain reasons for incoming call disablement, said call-receiving telephone terminal being capable of selecting one of the displayed plurality of statements explaining reasons for incoming call disablement and receiving input of a time period of incoming call disablement;
   storage means for storing said selected statement explaining the reason for incoming call disablement and said inputted time period of incoming call disablement; and
   notification means for performing processing to notify a call-making telephone terminal by means of alphanumeric information of said stored statement explaining the reason for incoming call disablement and said time period of incoming call disablement when a call is made from said call-making telephone terminal to said call-receiving telephone terminal at a time which is within the range of said stored time period of incoming call disablement,
   said system being characterized in that the stored statement explaining the reason for incoming call disablement and time period of incoming call disablement are automatically deleted when said stored time period of incoming call disablement has passed.

2. The system for providing information concerning incoming call disablement according to claim 1, characterized in that said storage means and notification means are provided in said call-receiving telephone terminal.

3. The system for providing information concerning incoming call disablement according to claim 1, characterized in that said storage means and notification means are communicably connected to a switchboard which performs telephone switching and provided in an answering machine center having a recording device which is capable of recording messages for said call-receiving telephone terminal when said call-receiving telephone terminal is in a state of incoming call disablement.

4. The system for providing information concerning incoming call disablement according to claim 1, characterized in that a carrier of said call-receiving telephone terminal may set a desired statement as said statement explaining the reason for incoming call disablement.

5. The system for providing information concerning incoming call disablement according to claim 1, characterized in that said call-receiving telephone terminal, upon input reception of the time period of incoming call disablement, displays the current time in a start time line and end time line of the time period of incoming call disablement and displays a cursor on said end time line to indicate that said input reception is possible, whereupon said input is received in each of the columns of said end time and said start time to which the cursor moves.

6. The system for providing information concerning incoming call disablement according to claim 1, characterized in that a fixed daily time period in accordance with the wishes of a carrier or owner of said call-receiving telephone terminal may be set as said time period of incoming call disablement.

7. The system for providing information concerning incoming call disablement according to claim 6, characterized in comprising setting cancellation restriction function which enables only the owner of said call-receiving telephone terminal, and not the carrier of said call-receiving telephone terminal, to cancel the setting of the fixed daily time period that is set as said time period of incoming call disablement.

8. The system for providing information concerning incoming call disablement according to claim 1, characterized in that said call-receiving telephone terminal is capable of receiving input of an amount of time of incoming call disablement and comprises calculation means which calculate the time from which incoming calls may be received on the basis of this amount of time of incoming call disablement, and characterized in that
   said storage means store the period from the time of input reception of said amount of time of incoming call disablement to said time from which incoming calls may be received as said time period of incoming call disablement.

9. The system for providing information concerning incoming call disablement according to claim 1, characterized in that said notification means perform processing to request from the call-making telephone terminal input of a preset, predetermined security code number when a call is made from said call-making telephone terminal to said call-receiving telephone terminal at a time which is within the range of said stored time period of incoming call disablement, and performs processing to notify the call-making telephone terminal of said stored statement explaining the reason for incoming call disablement and time period of incoming call disablement when said preset, predetermined security code number is inputted from the call-making telephone terminal.

10. A method for providing information concerning incoming call disablement, comprising at least the steps of:
   receiving from a call-receiving telephone terminal which is equipped with a display screen capable of displaying a preset plurality of statements explaining reasons for incoming call disablement a selection of one statement explaining a reason for incoming call disablement from the displayed plurality of statements, and receiving input of a time period of incoming call disablement;

storing said selected statement explaining the reason for incoming call disablement and said inputted time period of incoming call disablement;

performing processing for notifying a call-making telephone terminal by means of alphanumeric information of said statement explaining the reason for incoming call disablement and said time period of incoming call disablement, which are stored in said storage means, when a call is made from said call-making telephone terminal to said call-receiving telephone terminal at a time which is within the range of said stored time period of incoming call disablement; and automatically deleting the stored statement explaining the reason for incoming call disablement and the time period of incoming call disablement when said stored time period of incoming call disablement has passed.

* * * * *